April 26, 1955  H. H. CLINE  2,706,966
POULTRY WATERER
Filed June 5, 1953

INVENTOR.
HAROLD CLINE
BY
Oldham & Oldham
ATTORNEYS

United States Patent Office 2,706,966
Patented Apr. 26, 1955

2,706,966

POULTRY WATERER

Harold H. Cline, Loudonville, Ohio

Application June 5, 1953, Serial No. 359,885

14 Claims. (Cl. 119—74)

This invention relates to improvements in articles of manufacture, having particular significance in connection with drinking fluid supply means for poultry.

In the past, various types of tanks, troughs, fountains and other devices have been used for supplying water to poultry, but so far as I am aware, these have been open to various objections including high initial cost, lack of continuous circulation, inadequate filtering, inability to uniformly medicate the water, and the like. Particularly with chicks and broilers, there is a problem caused by the great activity of the birds with their tendencies to climb, kick and dirty up everything with which they come in contact.

With the raising of poultry now "big business" the utmost in efficiency is a necessity, and this high standard has not been reached by antiquated, small, out-of-date watering equipment of known type.

It is the general object of the present invention to provide relatively simple and inexpensive watering apparatus for overcoming the above mentioned difficulties.

A further object of the present invention is to provide an improved poultry waterer characterized by continuous circulation of repeatedly filtered and cleansed water together with controlled intermittent addition of water as needed.

Another object of the invention is to provide apparatus of the type described capable of adding uniform medication to the circulated water.

Other objects and advantages will become apparent and the invention will be better understood from the following description of a specific embodiment of the invention, although the invention itself is particularly and distinctly pointed out and set forth in the appended claims forming a part of this application. By way of example, preferred embodiments of my improved poultry waterer and of improved parts thereof, are illustrated in the accompanying drawing, in which:

Figure 1:
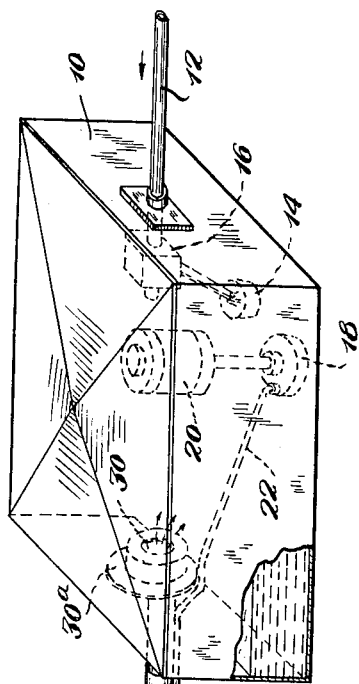
Fig. 1 is a side elevational view, partly in perspective, and broken away to accommodate the view on the length of the drawing sheet, and showing one form of waterer, for example for a brooder house, constructed in accordance with the invention.

Referring first to Fig. 1, I have shown a tank 10 which may be made of any material capable of holding water, or other liquid, and which may therefore be formed of plastic or of sheet metal. The tank 10 receives a liquid such as water from a forced pressure inlet 12 at periodic intervals responsive to the operation of a float 14 connected to a float valve 16 located at the end of inlet 12 to periodically discharge water into the tank when the level drops below the desired amount.

The tank 10 contains a centrifugal pump 18 driven by a quiet, small electric motor 20, the wiring for which is of conventional nature and has any desired controls. The pump derives its intake from the liquid in the tank itself and forces its output into a tube 22 which passes out through a wall of the tank and outward therefrom any desired distance, for example, 50 feet more or less in one form of the invention. At its end, remote from the tank, tube 22 is curved upwardly—inwardly—and downwardly, as indicated at 24. A return flow is provided by a watering trough 26 provided with a plurality of openings 28 in the top thereof, each of a size large enough to allow a chick's or a chicken's head to be introduced therein. The endmost opening 28e accommodates the end of the curved portion 24 of the tube 22, and the trough 26 serves as a return pipe having its discharge end enter the tank 10, at a point lower than the end. At the tank end, between the discharge from the trough and the entry to the tank at this point, there is interposed a removable filter screen 30 which serves to collect debris from the liquid and prevent its re-entry into the tank, or into the pump or into the tube 22. The level of water maintained in the tank 10 by the float valve 16 is lower than the discharge of trough 26 into the tank.

As previously indicated, in order that the watering trough will serve as a return to the tank, it is necessary that its far end be elevated above its discharge end, but this need only be a relatively slight elevation. I have found that a drop of approximately ¼ inch per 10 feet provides the type of flow I have found most beneficial. For example, for a 50 foot length of 2 inch diameter trough, I elevate the far end of the trough about 1¼ inches above the tank. Thus, if the height of the bottom of the trough where it enters the tank is 5 inches above floor or ground level, then, assuming a level floor or ground, the height of the bottom of the trough at its remote end would be 6¼ inches above floor or ground level.

In order to provide standard equipment readily adaptable to varying installation requirements (such as varying length of trough permissible, or sloping ground), I have found it preferable to provide the requisite difference of elevation of the trough ends by supporting the discharge end from the tank and the other or remote end on an adjustable bracket 32 having a bifurcated support arm portion 34, feet 36 and an interconnecting relatively slidable vertical member 38 received in a base portion of the bracket 32 with fastening means such as one or more pins (not shown) fitting in holes 40 in the sliding member and bracket for adjusting the height. Additional brackets 32 are provided at spaced points along the length of the trough 22.

The tank 10 has been illustrated as resting on the floor or ground and without feet. However, it can be provided with feet of adjustable height, the same as the tank of Fig. 3 and hereafter described.

Figure 2:
Fig. 2 is a cross-sectional view on the line 2—2 of Fig. 1.

Referring to Fig. 2, which is a cross-section on the line 2—2 of Fig. 1, it is seen that the cross-section of the trough 26 is much larger than the diameter of the feed tube 22. By way of example, the diameter of the trough may be 2 to 2½ inches and the diameter of the feed tube ¼ inch.

Figure 3:
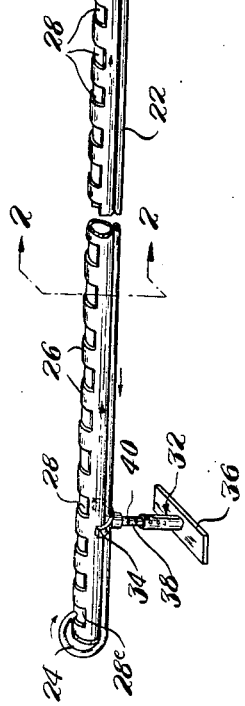
Fig. 3 shows a modified form of waterer, for example for use with smaller laying flocks, this view being in perspective.
Figure 3:
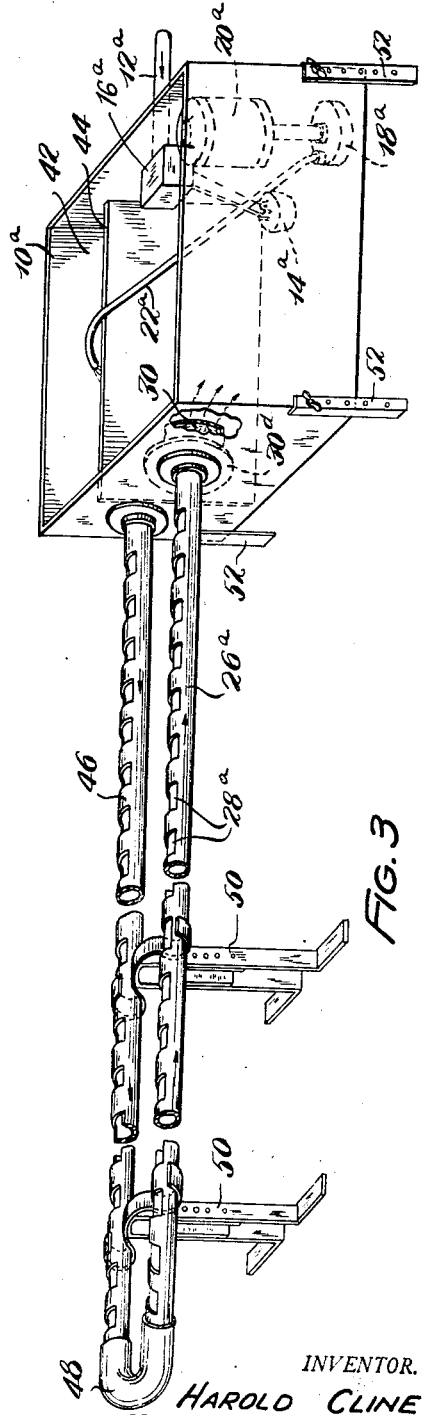

The arrangement just described is suitable for broilers located in a chicken house, or for a laying house. Another arrangement of the apparatus of my invention is illustrated in Fig. 3 wherein, like parts are numbered as in Fig. 1, but with the suffix "a" being added, 10a being the tank, 12a the intake, 14a the float valve, 16a the float, 18a the pump, 20a the motor, 22a the pump discharge conduit, 26a the return trough, and 30a the filter removably positioned by brackets 30d, or other conventional support means. In the arrangement of Fig. 3, however, conduit 22a discharges into a compartment 42 formed in the tank by means of a partition 44. The water is maintained at a higher level in compartment 42 than in the compartment of the tank containing pump 18a. From compartment 42 water flows out through a trough 46 formed of the same diameter pipe as the return trough 26a, the outlet trough 46 and the return trough 28 being connected at the end remote from the tank by an elbow fitting 48.

If the overall longitudinal length of the trough is 20 feet out and 20 feet return, a plurality of double pipe supports 50 may be provided each adjustable as was the pipe support of Fig. 1. As shown in Fig. 3, the tank itself is also provided with adjustable legs 52. Optionally, openings 28 at the top of the trough may be provided either in only the return line, or in both the outlet line and the return line so that the chicks or other poultry will have access to both of these lines. Optionally too, the trough or troughs could be completely open. Preferably, the tank 10 is provided with a removable cover (not shown) to keep out debris and to prevent animals from falling into the tank.

With the arrangement of Fig. 3, the flow not only in the return trough but in the outlet trough as well depends on gravity. I employ substantially the same difference of elevation previously indicated as desirable for some installations namely, ¼ inch drop to 10 feet of length. Thus, if the outlet trough 46 at the tank is 6 inches above floor level, the elbow 48 is 5½ inches above floor level, and the return trough 26a at the tank is 5 inches above floor level.

I thus provide apparatus of the character described capable of meeting the objects above set forth. In use, a continuous flow of water is circulated through the feed trough, this continuous circulation makes possible the filter action so that relatively pure water is circulated.

In continuous water circulation perhaps the sound of the water flowing has been found attractive to poultry inducing their intake of water and improving their health and weight as a result. Also, I am able to put any suitable soluble medication in the tank 10 or 10a at periodic intervals which is circulated with the water as a complete mix to produce the desired result.

In the use of the apparatus of my invention the motors 20 and 20a are adapted to be continuously driven to provide the continuous circulation of the water and the continuous filtering thereof. Any water taken from the system by the poultry or by evaporation is periodically replaced by the operation of the float valve 16 or 16a. Should the motor stop, for example, due to a power failure the tank 10 or 10a will contain all of the water in the system without overflow.

The invention has been described as circulating water, and this is its main application. However, the apparatus can be utilized to circulate other liquids for feeding purposes.

While particular embodiments of the invention are illustrated and described, various modifications may obviously be made without departing from the scope and true spirit of the invention which is therefore intended to be defined in the appended claims.

I claim:
1. As an article of manufacture, the combination of a tank, means for supplying liquid to said tank connecting thereto, a trough having at least one access opening along the top thereof and sloping from the horizontal to provide a high end and a low end with the low end connected to said tank to discharge liquid from the trough to the tank, the high end of the trough being remote from said tank, filter means interposed at the connection between said tank and trough, and pump and conduit means for continually supplying liquid from said tank to said high end of said trough directly connected therebetween.

2. In a continuous flow type of poultry waterer the combination of a reservoir tank, an outlet line extending from said tank to a point remote therefrom, a return trough having a plurality of access openings along the top thereof and sloping downward from said remote point where it is fed by said outlet line and connected to said tank, removable filter means interposed between said trough and tank, a continuously operated pump located within the tank to draw water therefrom and having its outlet directly connected to said outlet line, a water inlet for supplying make-up water to said tank, and a float operated valve for periodically controlling the addition of water to said tank through said water inlet.

3. The combination as in claim 2 further characterized by the provision of a plurality of tanks with the pump and its intake and the filter at the return trough outlet being located in one of said tanks, the pump outlet discharging into the other of said tanks spaced from said outlet line, and the outlet line receiving its water by gravity from said last mentioned tank.

4. The combination as in claim 2 further characterized by the provision of an adjustable support for said outlet line and return trough.

5. The combination as in claim 3 further characterized by adjustable legs for said tanks and for said trough.

6. The combination as in claim 2 further characterized by said outlet line having a relatively small cross-section compared to the cross-section of said trough and being beneath said trough along substantially the entire horizontal length thereof, and curving upward, horizontally inward toward the tank, and downward to discharge through one of the openings provided in the upper portion of the trough at the end thereof remote from said tank.

7. A livestock waterer comprising the combination of a water supply tank, a trough extending a distance from said tank open at the top and sloping from a remote high end to a low end adjacent and connected to said tank, filter means interposed between said trough low end and said tank, and pump means in said tank for circulating liquid from said tank to the remote end of said trough.

8. An an article of manufacture, the combination of a tank, a trough extending from said tank and having at least one access opening along the top thereof and sloping from the horizontal to provide a high end and a low end with the low end connected to said tank to discharge water therein, and the high end being remote from said tank, filter means for removing foreign matter from liquid flowing to said tank, and pump and conduit means connected to said tank and to the high end of said trough for continually supplying liquid from said tank to said high end of said trough.

9. The combination as in claim 8 further characterized by said conduit means being directly connected to the outlet of said pump means and being carried beneath said trough along substantially the entire length thereof and curving upwardly to discharge into the trough at the end thereof remote from said tank.

10. In combination in a poultry waterer, a tank, means in said tank for maintaining water at a selected level in the tank, a trough sloping slightly from the horizontal and connected at its lower end to the tank at a point above the level of the water therein, continuously driven pump means in the tank for continuously delivering water from the tank to the high end of the trough for gravity flow therethrough.

11. The combination in a poultry waterer consisting of, a tank, partition means for maintaining water at two different levels in the tank, a watering trough connected to the higher level of water in the tank and extending with a gradual slope to discharge by gravity flow the water into the tank above the lower level, support means for said trough, and pump means for continuously transferring water from the lower level to the higher level in the tank.

12. In a poultry waterer, a tank float, valve means adapted to connect to water supply means and control the heighth of water in said tank, a pump positioned in said tank and having an outlet, elongate narrow trough means extending from said tank but connected thereto, said trough having a portion remote from said tank positioned higher than the connection of said trough means to said tank, conduit means directly connecting the outlet of said pump to the remote portion of said trough for flow of water therethrough to said tank for recirculation therefrom by said pump, adjustable heighth means for supporting said trough means, and filter means operatively connected to said trough means to filter water passing therefrom into said tank.

13. In a poultry waterer, a tank float, valve means adapted to connect to water supply means and control the heighth of water in said tank, a pump positioned in said tank and having an outlet, trough means extending from said tank but connected thereto, said trough having a portion remote from said tank positioned higher than the connection of said trough means to said tank, conduit means directly connecting the outlet of said pump to the remote portion of said trough for flow of water therethrough to said tank for recirculation therefrom by said pump, and filter means operatively connected to said trough means to filter water passing therefrom into said tank.

14. In a poultry waterer, a tank float, valve means adapted to connect to water supply means and control the heighth of water in said tank, a pump positioned in said tank and having an outlet, trough means extending from said tank but connected thereto, said trough having a portion remote from said tank positioned higher than the connection of said trough means to said tank, conduit means directly connecting the outlet of said pump to the remote portion of said trough for flow of water therethrough to said tank for recirculation therefrom by said pump, adjustable heighth means for supporting said conduit means and said trough means, said float valve means maintaining water in said tank below the connection of said trough means thereto, and filter means operatively connected to said trough means to filter water passing therefrom into said tank.

References Cited in the file of this patent

UNITED STATES PATENTS

| | | |
|---|---|---|
| 1,446,493 | Belden | Feb. 27, 1923 |
| 1,574,756 | Peterson | Mar. 2, 1926 |
| 1,638,194 | Froendt | Aug. 9, 1927 |
| 2,292,020 | Venolia | Aug. 4, 1942 |
| 2,502,720 | Haley | Apr. 4, 1950 |

FOREIGN PATENTS

| | | |
|---|---|---|
| 431,041 | Great Britain | June 28, 1935 |